June 11, 1968 L. CIASCHI 3,388,390

ALARM SYSTEM HAVING RECORDED MESSAGES ON MAGNETIC DRUM

Filed April 12, 1965 3 Sheets-Sheet 1

INVENTOR

Lorenzo Ciaschi

BY Polachek & Saulsbury

ATTORNEYS.

ALARM SYSTEM HAVING RECORDED MESSAGES ON MAGNETIC DRUM

Filed April 12, 1965 3 Sheets-Sheet 2

INVENTOR

Lorenzo Ciaschi

BY

Polachek & Saulsbury

ATTORNEYS.

ALARM SYSTEM HAVING RECORDED MESSAGES ON MAGNETIC DRUM

Filed April 12, 1965 3 Sheets-Sheet 3

INVENTOR
Lorenzo Ciaschi

BY Polachek & Saulsbury
ATTORNEYS.

3,388,390
ALARM SYSTEM HAVING RECORDED MESSAGES ON MAGNETIC DRUM
Lorenzo Ciaschi, 680 Eagle Ave., Bronx, N.Y. 10455
Filed Apr. 12, 1965, Ser. No. 447,440
2 Claims. (Cl. 340—293)

ABSTRACT OF THE DISCLOSURE

An electric emergency alarm system is disclosed for use in public places. Switches are strategically located and can be operated in an emergency. The switches are connected in circuit with a message reproducing a rotating magnetic drum having a multiplicity of tracks on which are prerecorded messages. When a switch is operated, one or more remotely located loudspeakers reproduce audible the appropriate message. Sound recording means including a microphone, amplifier and a movable erase head are provided for erasing recorded massages and recording new messages on selected tracks.

This invention concerns an emergency alarm system for an apartment house, office building, hotel, hospital, subway station or other public place.

According to the invention each of a plurality of locations in a public place are designated call stations at which are located call switches connected in an emergency alarm system. When any call switch is operated in the event of a robbery, fire or other emergency, this switch is designated a "calling switch" and the location of the switch is designated a "calling station." The call stations may be the individual apartments in an apartment house, offices in an office building, rooms in a hotel, hospital, nursing home, museum, etc. Other call stations may be located at the outside entrance to a building, in an entrance lobby, in an elevator, in hallways at various floors of the building, etc. Call switches will be located at each of the call stations. The switches are connected in circuit with a signal board at a guard's station. On the signal board are signal lamps, each lamp arranged to light up when its call switch is operated.

The system also includes a sound recording and reproducing device on which are impressed messages corresponding to the several call stations at which are located the emergency call switches. Connected to the recording device is an amplifier and loudspeaker. The loudspeaker may be located out-of-doors such as on the wall over the entrance to a building protected by the system. Other loudspeakers can be located at the guard's station, at a municipal police station or other attended station. The other loudspeakers will also be connected to the amplifier. Each recorded message will identify a particular call station such as an apartment, room, hallway, etc. The system is maintained in a constant alert condition. If an emergency occurs at any location where an emergency call switch is installed, momentary closure of the call switch is sufficient to operate the system. All loudspeakers then announce audibly the location of the calling station where the emergency exists and the appropriate signal lamp lights up on the signal board. The audible and visible alarms continue until they are turned off.

While the system is applicable to an apartment house, it can also be installed in an office building, railroad station, subway station, bus station, hotel, hospital, bank, public park, museum etc.

It is a principal object of the invention to provide an emergency alarm system in which a plurality of emergency call stations are provided with emergency call switches, with sound reproducing means having prerecorded messages corresponding to the respective emergency call stations individually instantly available for audibly announcing repeatedly over a plurality of loudspeakers, when any one call switch is operated, the location of the calling station.

A further object is to provide a system as described, with a signal board having lamps corresponding to the respective call switches arranged to light up selectively when any one calling switch is operated to identify by a visible signal the calling station.

Another object is to provide an emergency alarm system as described, wherein the sound reproducing means includes a continuously rotating drum having a multiplicity of prerecorded emergency messages on magnetic tracks corresponding to the respective emergency call stations.

A further object is to provide a system as described, with means for changing quickly and easily the emergency message recorded on any one of the magnetic tracks.

Still another object is to provide an emergency alarm system adapted for servicing a multiplicity of emergency call stations or locations in pulic places such as apartment houses, hotels, hospitals, office buildings, nursing homes, banks, public parks, museums, rail and subway stations, etc.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

Figure 1:
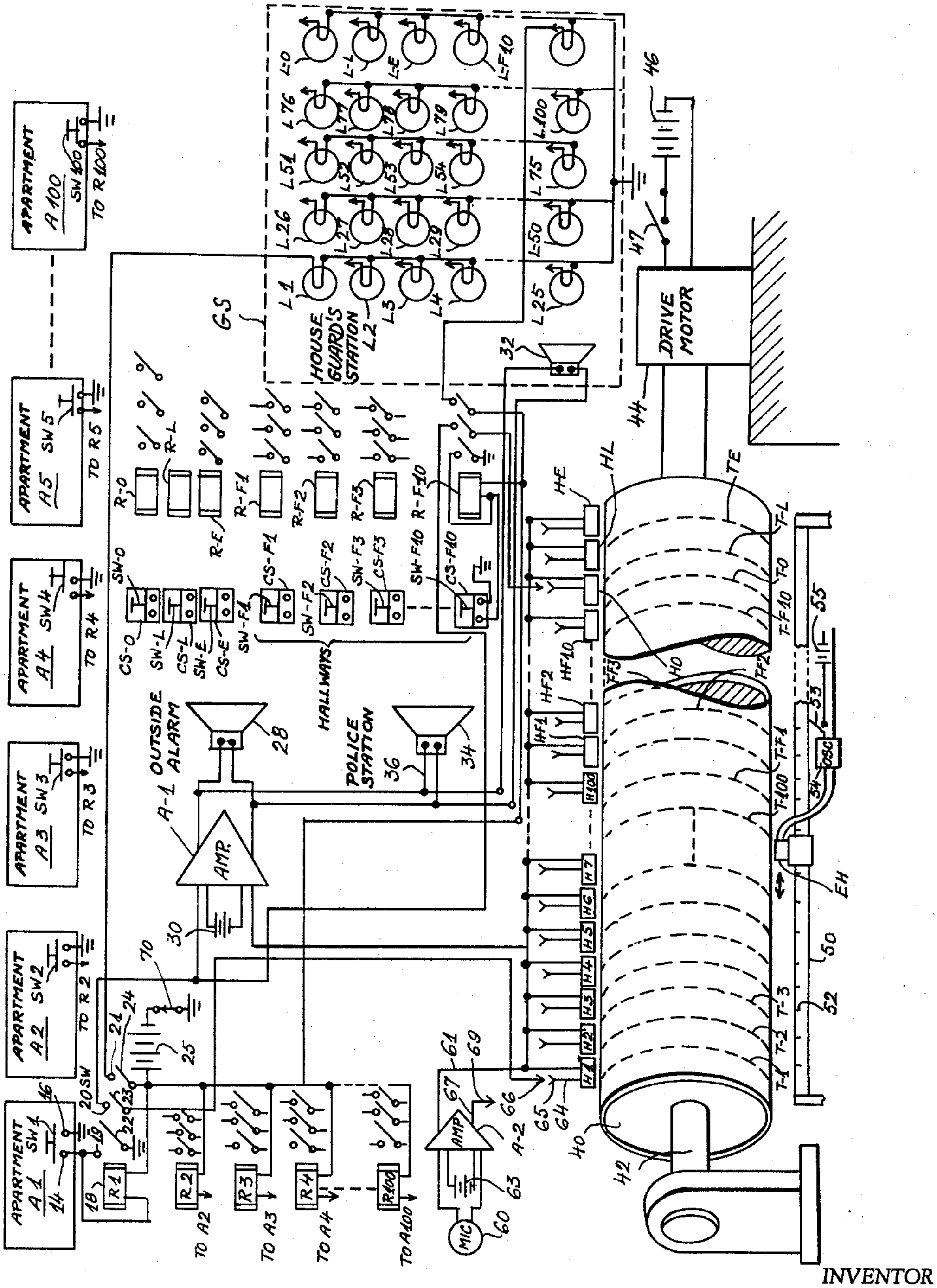
FIGURE 1 is a diagram of an emergency alarm system embodying the invention.

Referring to the drawings, there is shown schematically in FIG. 1 an emergency alarm system 10 having a first plurality of emergency call stations 12, individually designated A1–A100. A greater or lesser number of call stations may be designated in any particular public place or building where the system is installed. To facilitate explanation it will be assumed that the call stations are located individually in the respective apartments of an apartment house. Further call stations may be located outside the apartments at strategic points. For example, call station CS–O may be located at the outside entrance of the apartment house; call station CS–L may be located in the lobby of the house; call station SC–E may be located in the elevator; call stations CS–F1 through CS–F10 may be located in the hallways on the several floors of the house. A special guard's room, office or location is provided in the building, which is designated the house guard's station GS.

At each of the apartment call stations are located emergency call switches SW1–SW100. Call switches SW–O, SW–L and SW–E are located at the outside, lobby and elevator call stations. Call switches SW–F1 to SW–F10 are located in the hallways of the several floors respectively of the building.

Each of the call switches is a pushbutton switch which when once pressed and then released or held serves to actuate the audible and visual alarms of the system. Associated with each of the call switches is an individual relay R1–R100, R–O, R–L, R–E and R–F1 to R–F10. Each call switch has two contacts 14, 16. Each relay has a coil 18, three fixed contacts 19, 20, 21 and three movable contacts 22, 23 and 24 normally open with respect to their associated respective contacts 19, 20, 21. The system further includes a battery power supply 25 independent of the usual power supply of the building so that the system remains operative even though the building's power supply fails.

Figure 2:
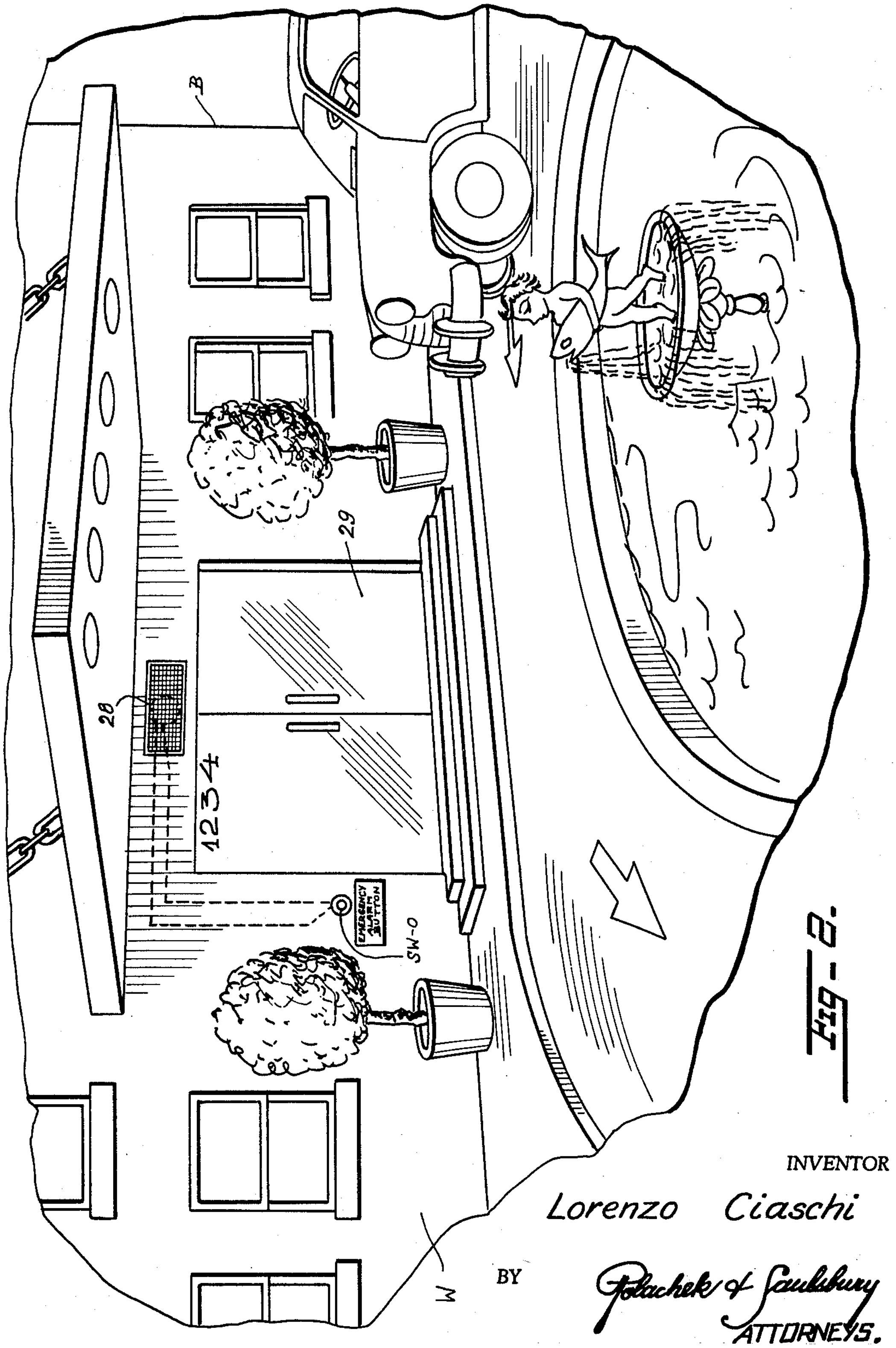
FIG. 2 is a fragmentary front view of a building showing parts of an emergency alarm system installed thereat.

A first loudspeaker 28 is located on the outside of the building B at its street entrance 29 as best shown in FIG. 2. Call switch SW–O is shown on the building wall W. The loudspeaker 28 is connected to and driven by an amplifier A–1 energized by an independent power supply 30. Connected in parallel with loudspeaker 28 may be another loudspeaker 32 located at the house guard's station GS. Another loudspeaker 34 may be located at a local, municipal police station or other emergency guard center. Loudspeaker 34 is connected via wires 36 in parallel with loudspeakers 28 and 32.

The system 10 includes a sound recording and reproducing device preferably in the form of a drum 40 which is continuously rotated on its supporting shaft 42 by a motor 44. The motor is energized by its own independent power supply 46 via manually operable switch 47.

The drum 40 has a magnetic coating 48 on which is impressed a multiplicity of recorded messages in individual circumferential message tracks T1–T100, T–F1 through T–F10, T–O, T–L and T–E. Associated with each of the tracks is an individual recording and reproducing magnetic head H1–H100, H–F1 through H–F10, H–O, H–L and H–E. Located near the drum and parallel to the axis thereof is a bar or rail 50 carrying an erase head EH connected to an oscillator 54 energized via switch 53 by its own independent power supply 55. The head EH can be moved along the rail to any selected track for erasing the message thereon. Lines 52 on the rail indicate erasing positions. Switch 53 is connected in circuit with the oscillator 54 for controlling applicating of alternating voltage to the erase head.

A microphone 60 is connected to the input of amplifier A–2 which is energized by its own independent power supply 63. The amplifier A–2 has one output line 61 connected to one lead 62 of each of the recording and reproducing heads. The other lead 64 of each recording and reproducing head is provided with a jack 65 into which can be inserted a plug 66 at the end of a wire 68 connected to movable contact 23 of the associated one of the relays R1–R100, etc. The other output line 67 of the amplifier A–2 has a plug 69 at its end which can be inserted into any one of jacks 65 when plug 66 is removed. The microphone 60 is used for recording a desired message on each individual track of the drum 40 after erase head EH is used to erase the previously recorded message.

The coil 18 of each relay is connected at one end to both relay contact 19 and to switch contact 14. The other end of the coil of each relay is connected to one terminal of power supply 25 and to relay contact 24. The other terminal of the power supply is connected via manually operable switch 70 to ground. Switch contact 16 of each call switch is grounded. Movable contact 22 of each relay is grounded. Contact 20 of each relay is connected to one input of the amplifier A–1.

At the guard's station GS is a panel on which are mounted signal lamps L1–L100, L–O, L–L, L–E, L–F1 through L–F10. Contact 21 of each of the relays is connected to one terminal of each of the lamps respectively. The other terminals of the lamps are grounded.

It will be apparent by inspection of the drawing that each call station includes a single call switch with which is associated in an emergency alarm circuit a single relay, a single recording-reproducing head, and a single signal lamp. The loudspeakers and amplifier A–1 are connected in common with all emergency alarm circuits.

The emergency alarm circuits of only call stations A–1 and CS–F10 are drawn in detail in FIG. 1. All other alarm circuits are similarly connected to their respective call switches, recording-reproducing heads and signal lamps.

The drum 40 rotates at slow speed. The message tracks each contain a single brief message. For example, the message on tracks T–1 may be: "HELP! HELP! APARTMENT A1!" and on track T–2: "HELP! HELP! APARTMENT A2!," etc. It will be noted that each track identifies a single calling station where help is required. As the drum rotates continuously, the reproduced message is repeated over and over until the system is disabled.

In operation of the system, drive motor 44 operates continuously when switch 47 is closed. The system is thus always alert twenty-four hours a day, seven days a week. Suppose during some emergency the tenant in apartment A1 closes switch SW1 momentarily and then releases the switch. Coil 18 of relay R1 will become energized. If the button of switch SW1 is released, the coil 18 will remain energized through closed contacts 19, 22 which act as a holding circuit. It is not necessary for the tenant to continue to press switch SW1 but if switch SW1 is held closed, the same condition will prevail and the system will be actuated since relay coil 18 will be energized. In any case, once coil 18 is energized and the movable contacts close with the fixed contacts, the holding circuit is completed and remains so until switch 70 in series with power supply 25 is opened, whereupon the relay coil 18 becomes deenergized and the relay contacts open.

When the contacts of relay R1 close, magnetic head H1 picks up the message from track T1 and passes it to amplifier A–1, and the message is reproduced audibly at loudspeakers 28, 32 and 34. The audio signal circuit may be traced through closed relay contacts 23, 24. The corresponding alarm signal lamp L1 at the guard's station GS lights up, through closed relay contacts 21, 24. The audible aud visual alarms are thus activated and remain activated until the emergency situation's relieved, and switch 70 is opened. Opening switch 70 deactivates the previously activated emergency alarm circuit. The switch 70 should then be closed immediately to alert the system for another emergency. All the emergency alarm circuits operate in the same way.

The microphone 60 and amplifier A–2 are used as mentioned above to change the recorded message on any one or all tracks when desired.

Figure 3:
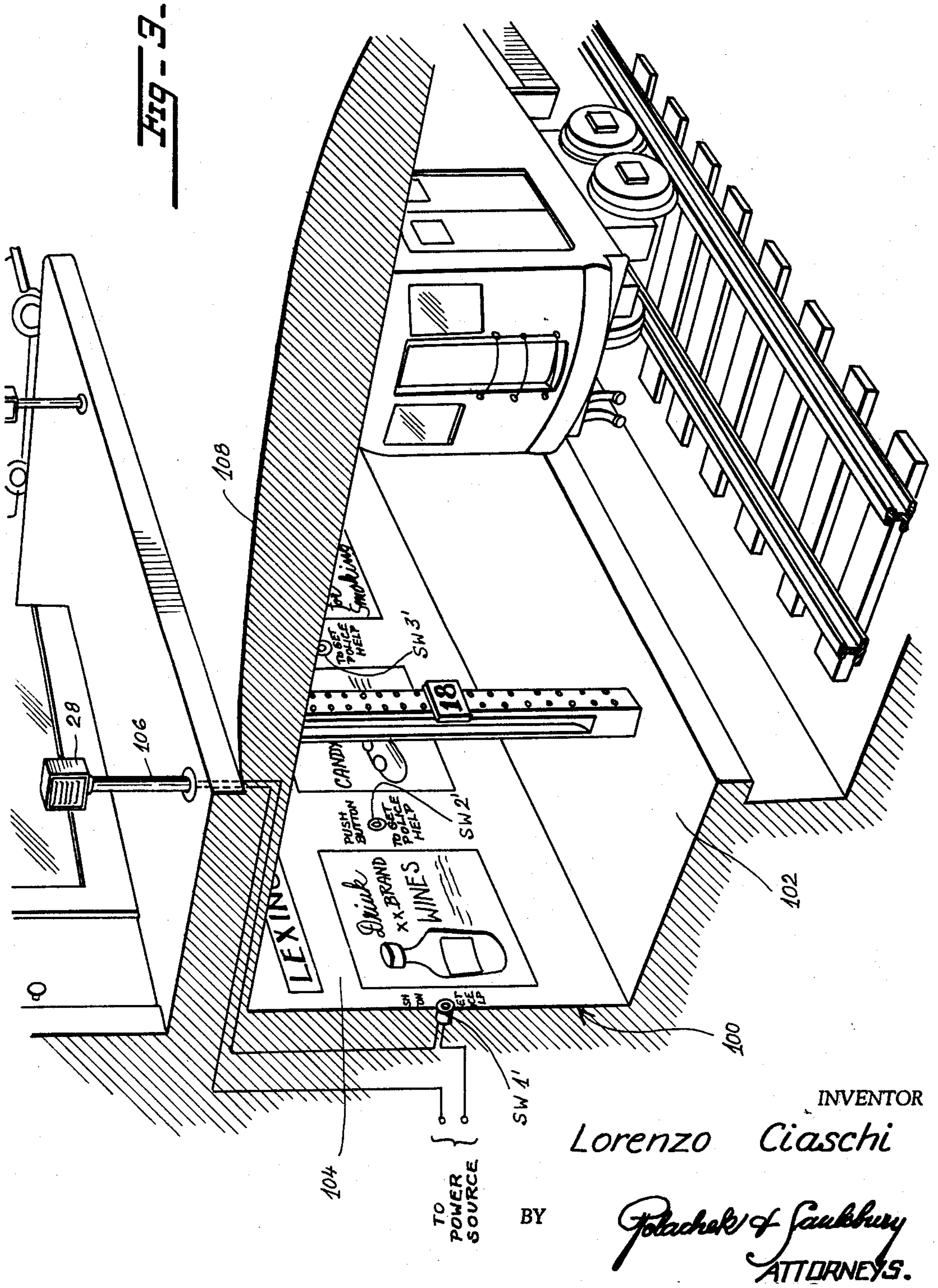
FIG. 3 is a fragmentary sectional view of a subway station showing parts of an emergency alarm system installed thereat.

Although the system has been explained in connection with an apartment house, it will be obvious that the system can be installed in any public place where a plurality of call stations are to be serviced. As a further example, FIG. 3 shows a subway station 100 having a platform 102. On the wall 104 above the platform are switches SW1′, SW2′, SW3′ etc. at spaced distances along the wall. The locations of these switches constitute the emergency call stations of the system. These switches will be connected in an emergency alarm system such as illustrated in FIG. 1. The loudspeaker 28 corresponding to loudspeaker 28 in system 10 will be located on a post 106 anchored in the pavement 108 of the public street above the station. The audible alarm will thus be broadcast in the street. The audible alarm will identify the precise location where the emergency is located. For example if a passenger is assaulted on the platform and presses switch SW1′ even momentarily, the system will at once announce audibly and repeatedly the call for help and the location of the emergency calling switch.

Other similar installations may be made in office buildings, museums, hospitals, nursing homes, banks, public parks, and other public places to provide continuous protection to the public. It will be noted that the system is so arranged that it is fail-safe. If vandals damage any one call switch, the other call switches remain operative. If a person calling leaves a calling station after pressing the calling switch, the system will still identify the location from which the call came, so that the police and guards alerted by the alarms can go directly to the calling station.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. An emergency alarm system, comprising a plurality of emergency call stations, an emergency call switch at each of said stations, a loudspeaker, an amplifier connected to said loudspeaker to drive the same, a sound reproducing device having a plurality of alarm messages recorded thereon, each of said messages including an identification of a different one of the call stations, a plurality of pickup means for selectively picking up one of the recorded messages from said device, emergency alarm circuit means interconnecting the call switches with the respective pickup means and with said amplifier so that a particular alarm message is picked up and reproduced by said loudspeaker when a particular one of the call switches is closed, said device including a single continuously rotating drum with said messages being recorded in a plurality of individual circumferential tracks on the drum, said pickup means being associated with said tracks respectively, whereby the selected alarm message is continuously repeated once said one call switch is closed, each of said tracks being a magnetized path on said drum, each of the pickup means comprising a magnetic head for picking up a message from the track; and means for recording a different message on each track comprising a rail disposed alongside the drum parallel to the axis of the drum, an erase head movable along the rail, oscillator means connected to the erase head for erasing the message on any selected track when the erase head is moved to position it at the selected track and the oscillator is energized, a microphone, another amplifier, other circuit means interconnecting the microphone and other amplifier means for disconnecting the emergency alarm circuit means from the magnetic heads, and means for connecting said other circuit means to each pickup head selectively, whereby the magnetic pickup head at a selected track can record a new message on the selected track.

2. An emergency alarm system, comprising a plurality of emergency call stations, an emergency call switch at eash of said stations, a loudspeaker, an amplifier connected to said loudspeaker to drive the same, a sound reproducing device having a plurality of alarm messages recorded thereon, each of said messages including an identification of a different one of the call stations, a plurality of pickup means for selectively picking up one of the recorded messages from said device, emergency alarm circuit means interconnecting the call switches with the respective pickup means and with said amplifier so that a particular alarm message is picked up and reproduced by said loudspeaker when a particular one of the call switches is closed, said device including a single continuously rotating drum with said messages being recorded in a plurality of individual circumferential tracks on the drum, said pickup means being associated with said tracks respectively, whereby the selected alarm message is continuously repeated once said one call switch is closed, a plurality of alarm lamps respectively connected in the emergency alarm circuit means so that a particular one of said alarm lamps lights up and remains lighted when said one call switch is closed, said alarm lamps being located at a guard's station for alerting a guard thereat, said loudspeaker being located in an out of doors location for summoning outside help, and another loudspeaker connected in parallel with the first named loudspeaker and located at the guard's station, whereby the guard thereat is alerted visually by a lighted alarm lamp and orally by continuous sounding of said other loudspeaker; and means for recording a different message on each track comprising a rail disposed alongside the drum parallel to the axis of the drum, an erase head movable along the rail, oscillator means connected to the erase head for erasing the message on any selected track when the erase head is moved to position it at the selected track and the oscillator is energized, a microphone, another amplifier, other circuit means interconnecting the microphone and other amplifier means for disconnecting the emergency alarm circuit means from the magnetic heads and means for connecting said other circuit means to each pickup heads selectively, whereby the magnetic pickup head at a selected track can record a new message on the selected track.

References Cited

UNITED STATES PATENTS

| | | | |
|---|---|---|---|
| 2,640,975 | 6/1953 | Roe et al. | 340—293 X |
| 2,944,245 | 7/1960 | Lynnworth et al. | 340—162 |
| 3,028,580 | 4/1962 | Durant | 340—162 |

JOHN W. CALDWELL, *Primary Examiner.*

H. I. PITTS, *Assistant Examiner.*